United States Patent [19]
Mai

[11] Patent Number: 5,358,360
[45] Date of Patent: Oct. 25, 1994

[54] DEVICE FOR SUPPLYING FLUID TO TOOL

[75] Inventor: Tsunetaka Mai, Osaka, Japan

[73] Assignee: Nikken Kosakusho Works, Ltd., Osaka, Japan

[21] Appl. No.: 60,184

[22] Filed: May 6, 1993

[30] Foreign Application Priority Data

Sep. 10, 1992 [JP] Japan .............................. 4-063456[U]

[51] Int. Cl.$^5$ .......................... B23B 51/06; B23C 5/28
[52] U.S. Cl. ...................................... 408/61; 279/20; 407/11; 409/136
[58] Field of Search ...................... 407/11; 408/56, 61; 279/20; 409/136

[56] References Cited

U.S. PATENT DOCUMENTS

| | | | |
|---|---|---|---|
| 3,861,694 | 1/1975 | Weber | 279/91 X |
| 4,213,354 | 7/1980 | Dahinden | 407/11 X |
| 4,669,933 | 6/1987 | Dye | 409/136 |
| 4,795,292 | 1/1989 | Dye | 409/136 |
| 5,275,516 | 1/1994 | Liaw | 408/61 X |

Primary Examiner—Steven C. Bishop
Attorney, Agent, or Firm—I. Morley Drucker

[57] ABSTRACT

A device for accurately supplying a fluid such as a cutting fluid to the cutting portion of a tool of any of a wide variety of tools includes a tool holder having an internal fluid passageway and a forward end formed to include an annular fluid supply groove in communication with the fluid passageway, a nozzle ring having nozzles communicating with the annular fluid supply groove, and a coupling ring, which is screwed onto the forward end of the tool holder, for fixedly fastening the nozzle ring to the tool holder in an attachable and detachable manner. A cutting fluid from a fluid supply source is fed under pressure to the nozzles of the nozzle ring through the fluid passageway and the annular fluid supply groove, and the cutting fluid is jetted from the nozzles toward the cutting portion of the tool, such as a drill, held by the tool holder. The number of nozzles in the nozzle ring and the direction thereof can be changed to make it possible to supply the fluid to the cutting portions of a wide variety of tools.

6 Claims, 4 Drawing Sheets

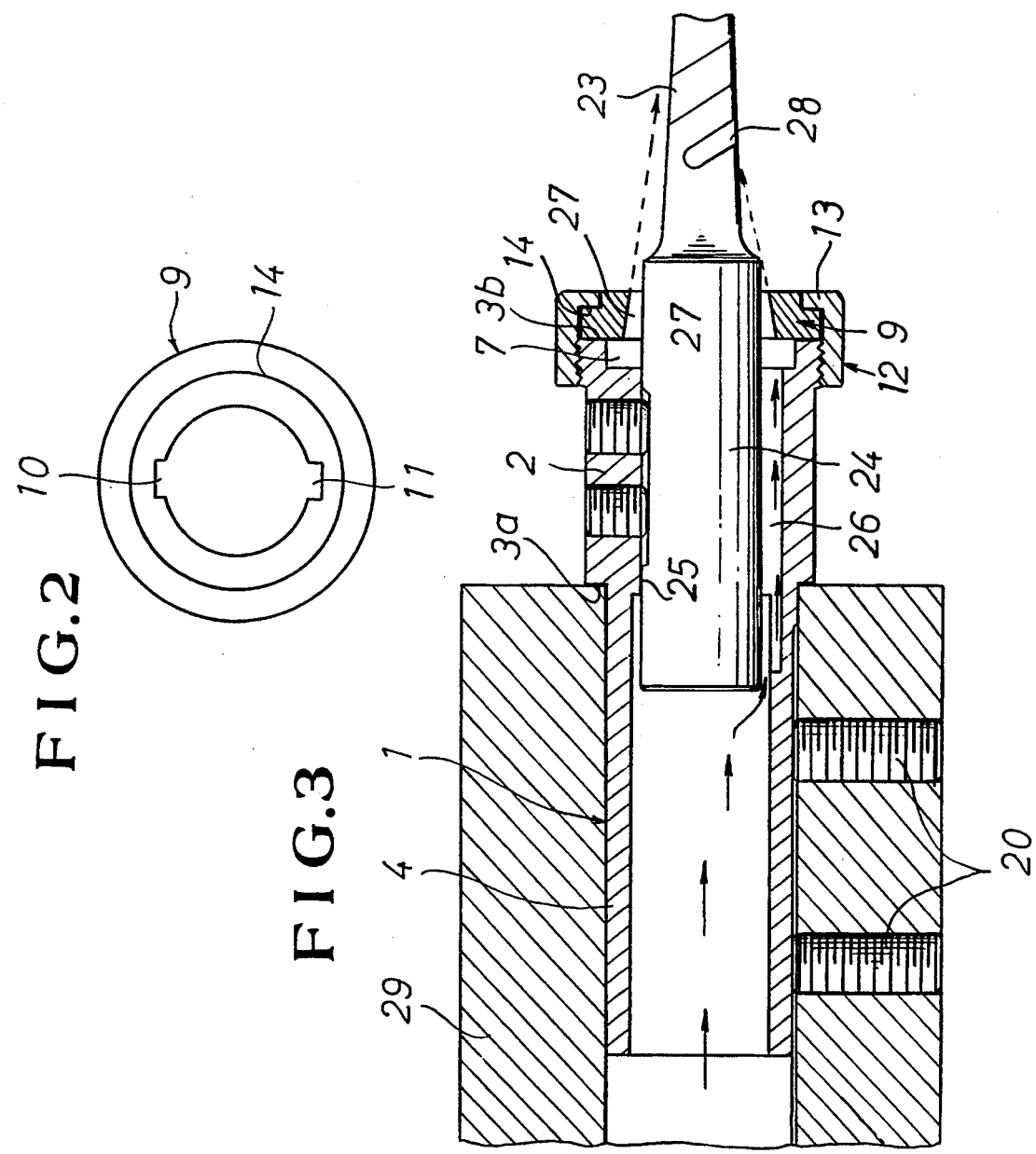

DEVICE FOR SUPPLYING FLUID TO TOOL

BACKGROUND OF THE INVENTION

1. Field of the Invention

This invention relates to a device for supplying a fluid such as a cutting fluid to the cutting portion of a tool such as a drill and the portion of a workpiece cut by the tool when the tool performs machining.

2. Description of the Prior Art

In a conventional fluid supply device of the kind described above, one example of which is disclosed in the specification of Japanese Utility Model Application Laid-Open (KOKAI) No. 61-184646, a tool holder for mounting and rotating a tool is formed to include a plurality of axially extending holes that supply a cutting fluid, a nozzle member is fitted into the distal end of each supply hole, the cutting fluid from a supply source of the same is fed under pressure to a nozzle, which is provided in each nozzle member, through the supply hole, and the cutting fluid is sprayed from these nozzles toward the cutting portion of the tool and the cut portion of the workpiece, thereby performing cooling and lubrication.

In another example of this conventional fluid supply device disclosed in the specification of Japanese Utility Model Application Laid-Open (KOKAI) No. 64-50034, a shank member to which the mounting shaft of a tool is fitted and secured is provided with a plurality of axially extending holes for supplying a cutting fluid, the distal end of each supply hole is formed to have an inclined nozzle hole connected thereto, the cutting fluid from a supply source of the same is fed under pressure to the nozzle holes through the supply holes, and the cutting fluid is supplied from these nozzle holes to the cutting portion of the tool and the cut portion of the workpiece.

In general, tools have cutting portions of a wide variety of shapes and dimensions, and machining conditions differ widely depending upon the shape of the workpiece, the depth to which the workpiece is machined, etc. Therefore, in order to supply a fluid such as a cutting fluid to the requisite portions accurately, it is required that the cutting-fluid supply holes, the nozzle members and the nozzle holes provided in the conventional tool holder or shank member described above be changed to conform to the tool used and the machining conditions. Consequently, machining and assembly are troublesome. An additional problem is that tool life is shortened unless the cutting fluid is supplied properly to such requisite locations as the base portion, mid-portion and distal end of the tool in conformity with the values of the length and outer diameter of the cutting portion of the tool. In particular, in a 24-hour operation that relies upon continuous unmanned machining, a long service life for a tool is strongly desired since a tool cannot be exchanged for a new one at night.

SUMMARY OF THE INVENTION

Accordingly, an object of the present invention is to provide a device capable of supplying a fluid such as a cutting fluid to a tool, the device being so adapted that the cutting fluid can be supplied accurately to requisite locations of the cutting portion of the tool in dependence upon the type of tool and the machining conditions, thereby prolonging tool life sufficiently, the device being further so adapted that exchange of the tool and a change in machining conditions can be dealt with in a simple manner.

According to the present invention, the foregoing object is attained by providing a device for supplying a fluid to a tool, in which the forward end portion of a tool holder in which the shank portion of a tool is fitted and held in an attachable and detachable manner is formed to have an annular supply groove open to the front end side of the tool holder, a fluid passageway that communicates the fluid supply groove with a fluid supply source is provided inside the tool holder, a nozzle ring is provided with nozzles that communicate with the fluid supply groove, the nozzles are opened to the front end side of the nozzle ring, and the nozzle ring is fixedly tightened on the front end portion of the tool holder in an attachable and detachable manner.

In a preferred embodiment of the device for supplying fluid to a tool, the nozzle ring is fixedly tightened in an attachable and detachable manner by a coupling ring threadedly engaged with the forward end portion of the tool holder.

In a preferred embodiment, the nozzle ring has, as an integral part thereof, a coupling portion mated with the forward end portion of the tool holder in an attachable and detachable manner.

In operation, a fluid such as cutting fluid from a supply source of the same is fed under pressure to the nozzles, which are provided in the nozzle ring, through fluid passageways and the annular supply groove. The fluid is capable of being supplied from the nozzles to the cutting portion of the tool, such as a drill or the like, and to the portion of a workpiece cut by the cutting portion.

Accordingly, a wide variety of tools having various lengths and diameters for their cutting portions can be accommodated merely by changing the nozzle ring or the nozzles provided in the nozzle ring. In addition, requisite locations in the axial direction, such as the base portion, mid-portion and tip of the cutting portions of these tools, as well as locations in the circumferential direction corresponding to a groove in the cutting portion, can be provided with nozzles so as to conform to the machining conditions. This makes it possible to deal with a wide variety of machining conditions and to accurately supply a cutting fluid or the like to the cutting portion of the tool and the portion of the workpiece cut by the cutting portion.

In a preferred embodiment, the coupling ring and the nozzle ring are capable of being separated. As a result, the nozzle ring can be selected and replaced merely by attaching and detaching the coupling ring, and a common coupling ring can be shared. In addition, the circumferential position of the fluid from the nozzle is readily adjusted and assembly is facilitated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a front view showing a nozzle ring in FIG. 1;

FIG. 3 is a longitudinal sectional view illustrating a device for supplying a cooling fluid to a tool according to a second embodiment of the present invention;

DESCRIPTION OF THE PREFERRED EMBODIMENTS

Preferred embodiments of the present invention will now be described in detail with reference to the drawings.

Figure 1:
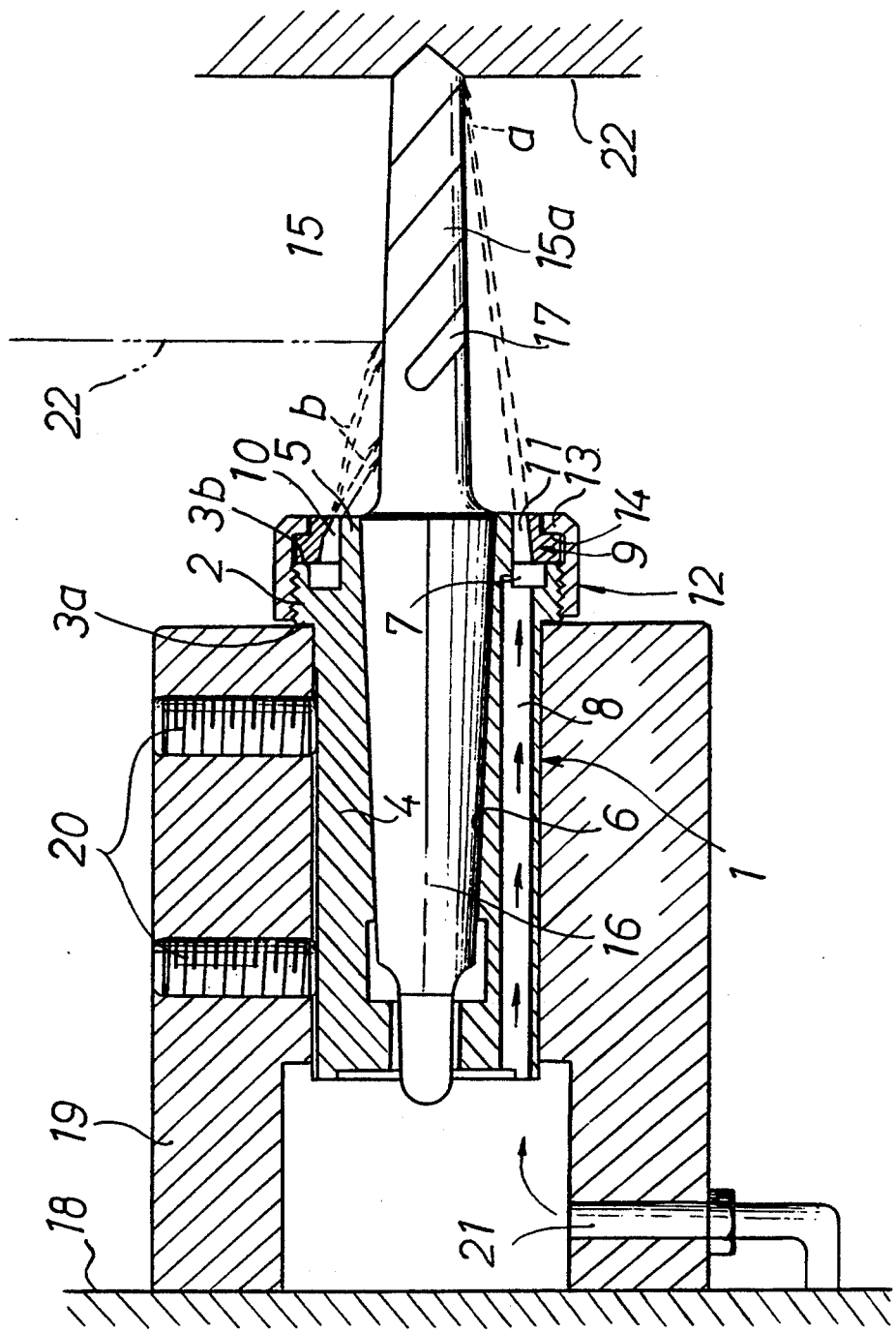
FIG. 1 is a longitudinal sectional view illustrating a device for supplying a cooling fluid to a tool according to a first embodiment of the present invention.

FIGS. 1 and 2 illustrate a first embodiment of the invention. As shown in FIG. 1, a tool holder 1 has a comparatively large outer-diameter portion 2 in the proximity of its forward end. The base end side of the large outer-diameter portion 2 is formed to have an insertion portion 4 via a step 3a, and the forward end side of the large outer-diameter portion 2 is formed to have a ring fitting portion 5, the outer diameter of which is less than that of the outer-diameter portion 2, via a step 3b. Further, the tool holder 1 is formed to include a tapered tool holding hole 6 open to the forward end face of the tool holder.

The step 3b of the tool holder 1 is formed to have an annular fluid supply groove 7 the center of which is the axis of the tool holder. A fluid passageway 8 in communication with the fluid supply groove 7 is formed axially of the tool holder 1 and opens to the base end face of the tool holder 1. It should be noted that the fluid passageway 8 is a linear hole formed in the tool holder 1 outwardly of the tool holding hole 6. A plurality, e.g., two, of the fluid passageways 8 are formed in the tool holder 1 and are spaced apart equidistantly in the circumferential direction.

A nozzle ring 9 is capable of being attachably and detachably fitted onto the ring fitting portion 5, which is provided on the forward end side of the large outer-diameter portion 2 of tool holder 1. The nozzle ring 9 has a forward end side formed to a small outer diameter via a step 14, and the base end face of the nozzle ring 9 is supported on the step 3b of the forward end side of the large outer-diameter portion 2. The nozzle ring 9 is provided with two types of nozzles, namely a nozzle 10 directed toward the base end of a tool 15 and a nozzle 11 directed toward the tip of the tool 15. The nozzles 10, 11 are delimited by a groove formed in the inner circumferential surface of the nozzle ring 9 and the outer circumferential surface of the forward portion of tool holder 1, and the forward ends thereof open to the forward end face of the nozzle ring 9.

As illustrated in FIG. 2, the nozzle 10 directed toward the base end has its outer circumferential side surface sharply inclined to reduce the transverse sectional area in the forward direction, and the nozzle 11 directed toward the tip has its outer circumferential side surface gradually inclined to reduce the transverse sectional area in the forward direction. A plurality of the nozzles 10, 11 are formed spaced apart equidistantly in the circumferential direction of the ring nozzle 9 and are arranged in staggered relation relative to the fluid passageways 8 in the circumferential direction.

The outer circumferential surface of the large outer-diameter portion 2 of tool holder 1 is formed to have a male screw with which a coupling ring 12 is threadedly engaged. The coupling ring 12 has a forward end the center of which is formed to include a flange-shaped projection 13. The step 14 of nozzle ring 9 is supported from the forward side thereof by the projection 13, and the nozzle ring 9 is urged against the step 3b of the tool holder 1 by tightening the coupling ring 12 on the large outer-diameter portion 2. The nozzle ring 9 is removed by detaching the coupling ring 12 from the tool holder 1.

A tapered shank 16 of the tool 15 comprising a drill is fitted into and held by tool holding hole 6 of the tool holder 1 in an attachable and detachable manner. The tapered shank 16 is secured to the tool holder 1 by suitable means so that a cutting portion 15a of the tool 15 projects from the forward end of the tool holder 1. In this case, the nozzle 10 directed toward the base end is circumferentially positioned to agree with the base end portion of a groove 17 provided in the cutting portion 15a of the tool 15. If necessary, the coupling ring 12 is loosened at this time so that the nozzle ring 9 may be turned slightly to achieve the above-mentioned positioning, after which the coupling ring 19 is tightened.

The insertion portion 4 of the tool holder 1 is attachably and detachably fitted into a tool rest 19 provided on a turret drum 18, which is for multiple-spindle machining, of a machine tool, the step 3a of the tool holder 1 is abutted against the forward end face of the tool rest 19, and the insertion portion 4 is fixedly secured to the tool rest 19 by tightening clamp bolts 20 that are screwed into the tool rest 19. The fluid passageway 8 is connected to a cutting-fluid supply source (not shown) via a connecting passageway 21 provided in the tool rest 19.

In the state described above, the tool holder 1 and tool 15 are advanced by the tool rest 19, the cutting fluid from the supply source (not shown) is fed under pressure to the base- and tip-directed nozzles 10, 11 via the connecting passageway 21, fluid passageway 8 and annular fluid supply groove 7, and the cutting fluid is supplied by being jetted toward the portion of a rotating workpiece 22 drilled by the cutting portion 15a of the tool 15, thereby cooling the cutting portion 15a of the tool 15 and the cut portion of the workpiece 22.

At the time of the above-described machining operation, the cutting fluid jetted from the tip-directed nozzle 11 in the direction indicated by arrows a is supplied so as to strike the cut portion accurately at the drilling starting position indicated by the solid lines in FIG. 1. The cutting fluid jetted from the base-directed nozzle 10 in the direction indicated by arrows b is supplied so as to strike the cut portion accurately at the position of the workpiece 22 when it is moved into contact with the tool 15 to achieve the prescribed drilling depth, the final position of the workpiece being indicated by the two-dot chain line 22 in FIG. 1. Thus, satisfactory cooling can be performed from the beginning to the end of the drilling operation.

Figure 4:
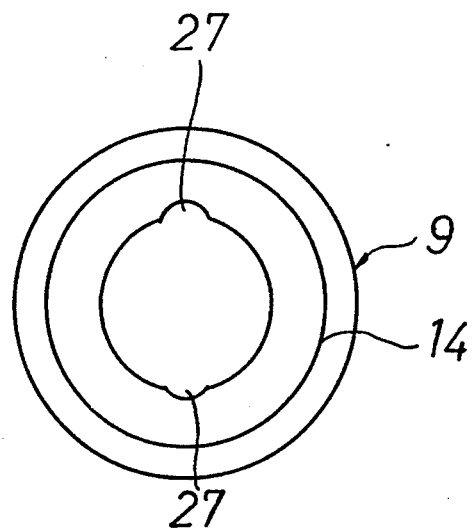
FIG. 4 is a front view showing a nozzle ring in FIG. 3.

FIGS. 3 and 4 illustrate a second embodiment of the present invention. In this embodiment, the insertion portion 4 of the tool holder 1 is formed to have a tool holder hole 25 comprising a linear bore, and the forward end face of the large outer-diameter portion 2 provided on the forward end side of the insertion portion 4 via the step 3a serves as the forward end face of the tool holder 1. The inner peripheral portion of this forward end face is formed to have the fluid supply groove 7 comprising an annular cut-out, and the fluid supply groove 7 is communicated with a fluid passageway 26 comprising a groove formed axially in the wall portion of the tool holding hole 25. A tool 23 is an end mill having a straight shank 24 and is fixedly fitted into the tool holding hole 25 of the tool holder 1. The nozzle ring 9 is urged against the forward end face of the tool holder 1 by the coupling ring 12 tightened on the large outer-diameter portion 2 of the tool holder 1. The nozzle ring 9 is formed to have two or three nozzles 27, which correspond to the number of grooves in the tool 23. The openings at the distal ends of these nozzles are positioned circumferentially to agree with the base end of a groove 28 of the tool 23. The second embodiment differs from the first embodiment only in the points mentioned above and is identical with the first embodiment in all other aspects.

The tool holder 1 is attachably and detachably fitted into a spindle 29 of a machine tool, and the tool holder 1 and tool 23 are advanced while being rotated by the spindle 29. Concurrently, a cutting fluid from a supply source (not shown) is fed under pressure to the nozzles 27 via the annular fluid passageway 7 provided by cutting away the forward end face of the tool holder 1. The cutting fluid is jetted from the nozzles 27 toward the portion of a workpiece subjected to reaming by the tool 23. As a result, the tool 23 and the machined portion of the workpiece are cooled.

Portions in FIGS. 3 and 4 corresponding to the first embodiment are designated by the same reference characters used in the first embodiment and need not be described again.

In the first and second embodiments described above, a wide variety of tools having various lengths and diameters for their cutting portions can be accommodated merely by changing the nozzle ring or the nozzles provided in the nozzle ring. In addition, requisite locations in the axial direction of the cutting portion of the tool, such as the base portion, mid-portion and tip thereof, as well as locations in the circumferential direction corresponding to a groove in the cutting portion, can be provided with nozzles so as to conform to the machining conditions. This makes it possible to cope with a wide variety of machining conditions and to accurately supply a cutting fluid or the like to the cutting portion of the tool and the portion of the workpiece cut by the cutting portion.

Further, the coupling ring and the nozzle ring are capable of being separated. As a result, it is possible to employ a common coupling ring and the nozzle ring can be selected and replaced merely by attaching and detaching the coupling ring. Since the annular fluid supply groove provided in the tool holder and the nozzles provided in the nozzle ring are always in communication even if the tool holder and nozzle ring are moved relative to each other in the circumferential direction, the circumferential position of the nozzle can be adjusted with ease and assembly is facilitated. Accordingly, tool life can be extended and it is easy to accommodate changes in tools and machining conditions.

Figure 5:
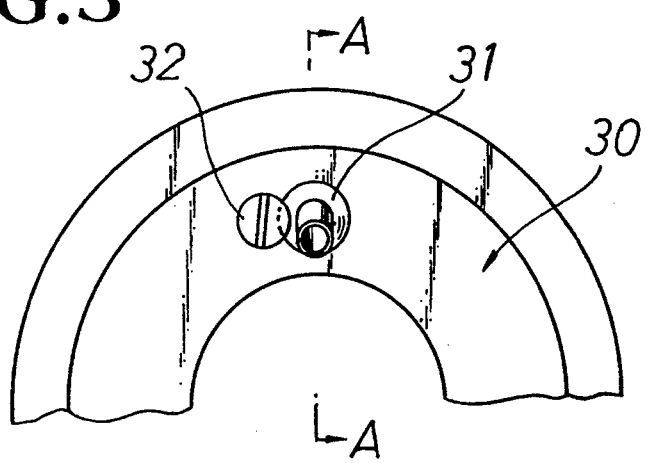
FIG. 5 is a partial end view of the tip of a nozzle ring illustrating a modification of a nozzle according to the invention.
Figure 6:
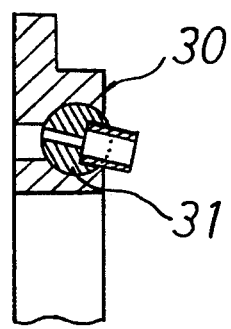
FIG. 6 is a sectional view taken along line A—A of FIG. 5.

FIGS. 5 and 6 illustrate a modification of the nozzles. Here a ball nozzle 31 in which the jetting direction of the cutting fluid is capable of being changed is mounted in the forward end of a nozzle ring 30 so as to be capable of turning freely. By tightening a locking flat-head screw 32 screwed into the nozzle ring 30, the ball nozzle 31 is locked and fixed. The nozzle ring 30 thus fitted with the nozzle 31 is used in place of the nozzles of the first and second embodiments.

Figure 7:
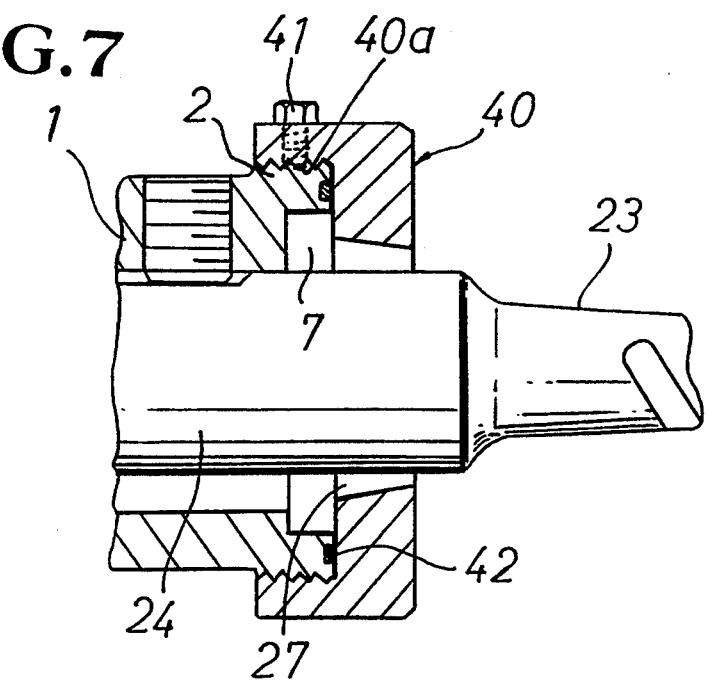
FIG. 7 is a longitudinal sectional view illustrating a modification of the nozzle ring according to the invention.

FIG. 7 illustrates a modification of the nozzle ring, which here is indicated at reference numeral 40. The forward side of the nozzle ring 40 is provided with nozzles 27 communicating with the annular fluid supply groove 7 of the tool holder 1, and the rearward side of the nozzle ring 40 is integrally formed to have a coupling portion 40a threadedly engaged with a threaded portion provided on the large outer-diameter portion 2 of the tool holder 1. The nozzle ring 40 thus is constructed to perform the functions of both the coupling ring 12 and nozzle ring 9 in the first and second embodiments.

Numeral 41 denotes a fixing bolt that prevents loosening of the nozzle ring 40 screwed onto the large outer-diameter portion 2 of the tool holder 1. Numeral 42 denotes a seal for preventing leakage of the cutting fluid. Other structural features are substantially the same as those of the second embodiment.

In the embodiment set forth above, a case is described in which the tool holder 1 has a threaded portion on the large outer-diameter portion 2 of the tool holder 1. However, in a case where the large outer-diameter portion 2 is not threaded but is smooth, it is of course possible to attach the nozzle ring 40 to the large outer-diameter portion 2 by fitting it on rather than forming the threads on the coupling portion 40a, and fix the fitted portion by the fixing bolt 41.

In accordance with the embodiment constructed as set forth above, therefore, the directions of the nozzles provided in the nozzle ring 40 can easily be positioned and secured at appropriate locations along the axial direction of the tool, and the assembly operation is simplified. This improves operability.

Furthermore, in each of the foregoing embodiments, the nozzle ring 9 or 40 is secured to the large outer-diameter portion 2 of the tool holder 1 by the coupling ring 12 or the coupling portion 40a formed as an integral part of the nozzle ring 40. However, this invention is not limited to this arrangement. It is possible to secure the nozzle ring 9 to the forward end face of the tool holder 1, namely to the end face that abuts against the nozzle ring 9, directly from the axial direction by means of bolts or the like.

Figure 8:
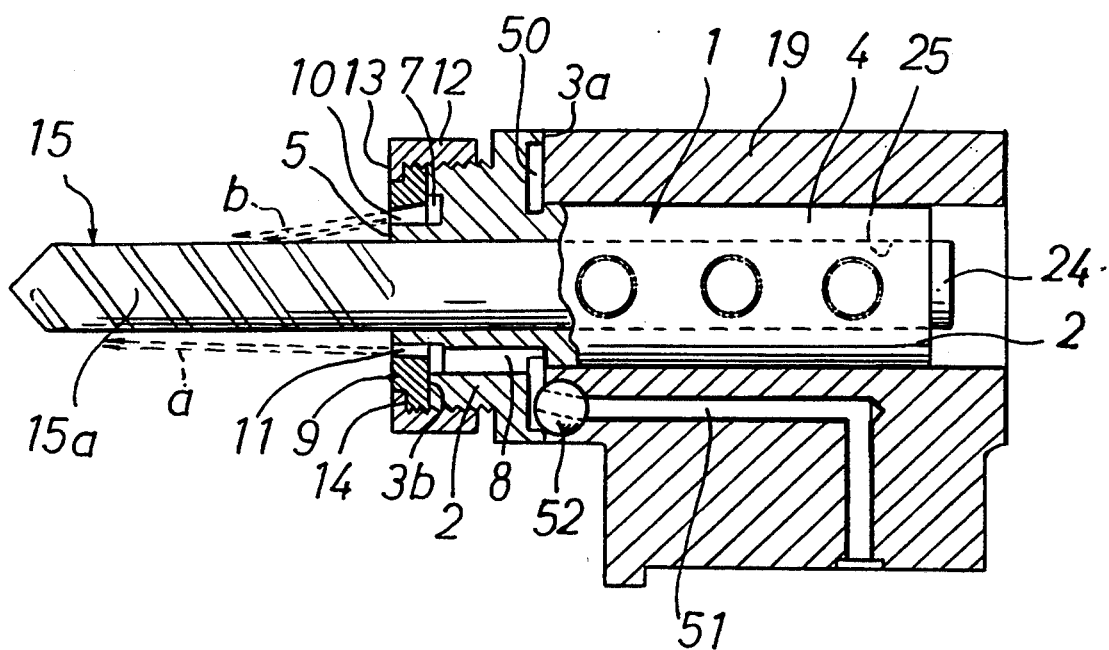
FIG. 8 is a longitudinal sectional view illustrating a device for supplying a cooling fluid to a tool according to a third embodiment of the present invention.

FIG. 8 illustrates a third embodiment of the invention. Here the large outer-diameter portion 2 of the tool holder 1 is formed to have a base-end side annular groove 50 that is open to the base end of the tool holder. The annular groove 50 and the fluid supply groove 7 are communicated by the fluid passageway 8, which is formed solely in the large-diameter portion 2. Further, a supply source (not shown) of a cutting fluid is connected to the base-end side annular groove 50 via a connecting hole 51, which is formed in the tool rest 19, and a ball- or roller-type flow-rate control member 52. The base end face of the large-diameter portion 2 is urged against the forward end face of the tool rest 19 to close the terminus of the annular groove 50.

The cutting fluid from the supply source passes through the connecting hole 51 and is throttled slightly by the flow-rate control member 52 before being supplied to the annular groove 50.

Other structural features and the operation of the third embodiment are substantially similar to those of the first embodiment. Portions in FIG. 8 corresponding to those in FIGS. 1 and 3 are designated by like reference numerals.

In the present invention, the directions of the nozzles provided in the nozzle ring are not limited to those of the above-described embodiments. It will suffice to jet the cutting fluid toward appropriate locations in the axial direction of the tool, the number of nozzles may be the same as the number of grooves in the tool, the nozzles may be placed at positions corresponding to respective ones of these grooves, and the cutting fluid may be supplied to the interior of the grooves. Further, the nozzles may be holes that penetrate the nozzle ring in the axial direction. A boring tool can be used as the tool in addition to the drill and end mill mentioned above, and the cooling fluid is not limited to the cutting fluid set forth in the first and second embodiments. The cooling fluid used can be high-pressure water or cooling air. In addition, the construction of the tool holder also is not limited to that of the two embodiments described above but can be changed as required.

In the device for supplying fluid to a tool according to the present invention, as described above, the forward end portion of a tool holder in which the shank portion of a tool is fitted and held in an attachable and detachable manner is formed to have an annular supply groove open to the front end side of the tool holder, a fluid passageway that communicates the fluid supply groove with a fluid supply source is provided inside the tool holder, a nozzle ring is provided with nozzles that communicate with the fluid supply groove, the nozzles are opened to the front end side of the nozzle ring, and the nozzle ring is fixedly tightened on the front end portion of the tool holder in an attachable and detachable manner. By virtue of this construction, the following advantages are obtained:

A fluid such as cutting fluid from a supply source of the same is fed under pressure to the nozzles, which are provided in the nozzle ring, through fluid passageways and the annular supply groove. The fluid is capable of being supplied from the nozzles to the cutting portion of the tool, such as a drill or the like, and to the portion of a workpiece cut by the cutting portion.

Accordingly, a wide variety of tools having various lengths and diameters for their cutting portions can be accommodated merely by changing the nozzle ring or the nozzles provided in the nozzle ring. In addition, requisite locations in the axial direction, such as the base portion, mid-portion and tip of the cutting portions of these tools, as well as locations in the circumferential direction corresponding to a groove in the cutting portion, can be provided with nozzles so as to conform to the machining conditions. This makes it possible to deal with a wide variety of machining conditions and to accurately supply a cutting fluid or the like to the cutting portion of the tool and the portion of the workpiece cut by the cutting portion.

The coupling ring and the nozzle ring are capable of being separated. As a result, the nozzle ring can be selected and replaced merely by attaching and detaching the coupling ring, and a common coupling ring can be shared by shared. In addition, the circumferential position of the fluid from the nozzle is readily adjusted and assembly is facilitated.

Furthermore, a wide variety of tools can be accommodated merely by changing the nozzle ring or the nozzles provided in the nozzle ring. In addition, requisite locations in the axial direction of the cutting portion of the tool, such as the base portion, mid-portion and tip thereof, as well as locations in the circumferential direction corresponding to a groove in the cutting portion, can be provided with nozzles so as to conform to the machining conditions. This makes it possible to cope with a wide variety of machining conditions and to accurately supply a cutting fluid or the like to the cutting portion of the tool and the portion of the workpiece cut by the cutting portion.

Further, since the coupling ring and the nozzle ring are capable of being separated, it is possible to employ a common coupling ring and the nozzle ring can be selected and replaced merely by attaching and detaching the coupling ring. Since the annular fluid supply groove provided in the tool holder and the nozzles provided in the nozzle ring are always in communication even if the tool holder and nozzle ring are moved relative to each other in the circumferential direction, the circumferential position of the nozzle can be adjusted with ease and assembly is facilitated. Accordingly, tool life can be extended and it is easy to accommodate changes in tools and machining conditions.

As many apparently widely different embodiments of the present invention can be made without departing from the spirit and scope thereof, it is to be understood that the invention is not limited to the specific embodiments thereof except as defined in the appended claims.

What is claimed is:

1. A device for supplying a fluid to a tool with a shank for machining a workpiece, said device comprising:

a tool holder for receiving and holding the shank of the tool in an attachable and detachable manner, said tool holder having a forward end formed to include an annular fluid supply groove open at said forward end, and an interior provided with a fluid passageway for communicating said fluid supply groove with a supply source of the fluid; and a nozzle ring having a forward side and provided with a plurality of nozzles which are unadjustably formed in said nozzle ring and which are open to said forward side and communicating with said fluid supply groove, said nozzle ring being fixed to the forward end of said tool holder in an attachable and detachable manner, wherein said nozzle ring is designed to be used with a particular tool, and the nozzle ring and tool it is used with are chosen depending on the machining requirements of the workpiece, and wherein each said nozzle is oriented such as to direct the fluid to different points along the length of the tool the device is being used with, to thereby ensure that the tool is properly lubricated along its length during its use, especially at a tip of the tool and at a base portion of the tool.

2. The device according to claim 1, wherein said nozzle ring is fixedly tightened in an attachable and detachable manner by a coupling ring threadedly engaged with the forward end portion of said tool holder.

3. The device according to claim 1, wherein said nozzle ring has, as an integral part thereof, a coupling portion mated with the forward end portion of said tool holder in an attachable and detachable manner.

4. The device according to claim 1, wherein said plurality of said nozzles are disposed in said nozzle ring to lie adjacent to the shank of the tool, and wherein said nozzles thus direct fluid to the tool along trajectories lying close to the tool, and thus provide effective fluid supply to the tool even when the tool is bored deep into a workpiece.

5. The device according to claim 1, wherein said plurality of nozzles are adjustably positioned on said nozzle ring to allow the angle at which the fluid is directed to the tool to be adjusted as desired.

6. A device for supplying a fluid to a milling tool for machining a workpiece, said milling tool having a straight shank and a cutting portion with a plurality of grooves formed therein, said device comprising:
- a tool holder for receiving and holding the straight shank of the milling tool in an attachable and detachable manner, said tool holder having a forward end formed to include an annular fluid supply groove open at said forward end, and an interior provided with a fluid passageway for communicating said fluid supply groove with a supply source of the fluid; and
- a nozzle ring having a forward side and provided with a plurality of nozzles which are unadjustably formed in said nozzle ring and which are at least equal in number to said number of grooves in said milling tool, said nozzles being open at said forward side and communicating with said fluid supply groove, said nozzle ring being fixed to the forward end of said tool holder in an attachable and detachable manner, wherein each said nozzle is disposed in said nozzle ring to lie adjacent to the shank of the milling tool, and each nozzle is oriented such as to direct the fluid to different grooves at different longitudinal positions along the length of the milling tool, to thereby ensure that the milling tool is properly lubricated along its length during its use, especially at a tip of the milling tool and at a base portion of the milling tool, even when a deep hole is to be bored in a workpiece, wherein said nozzle ring is designed to be used with a particular milling tool, and the nozzle ring and milling tool it is used with are chosen depending on the machining requirements of the workpiece.

* * * * *